Patented July 3, 1934

1,965,355

UNITED STATES PATENT OFFICE 1,965,355

YEASTED MILK

Charles L. Patterson, New York, N. Y.

No Drawing. Application May 6, 1930, Serial No. 450,315

11 Claims. (Cl. 99—11)

My present invention is concerned generally with the provision of a modified milk beverage and a method of manufacturing the same, and is especially concerned with yeasted milk and a process of making it.

An object of the invention is to produce a highly palatable modified milk beverage containing substantially pure yeast and to thereby eliminate the present necessity for consuming the yeast cake in a highly unpalatable form and in a form in which the consumer who is eating the yeast for medicinal purposes is obliged to consume a considerable quantity of starch which may in some cases offset, at least in part, the medicinal value of the yeast itself.

Another object is to provide a yeasted milk which will fully meet the requirements of the board of health regulations as to pasteurization, and yet which will contain the four essential vitamins A, B, D and E, in contradistinction to present forms of pasteurized milk containing only A, B and D. Furthermore, since yeast is rich in both B and D vitamins, the yeasted milk is exceptionally rich in them.

Another object of the invention is to provide a yeasted milk of the highly nutritive and medicinal character set forth above in which all of the nutritive values of the yeast and milk are combined and the characteristics of both yeast and milk which tend to render both substances unpalatable to certain people are substantially neutralized and offset one by the other, the resulting beverage containing none of the chalky taste which characterizes skimmed milk and the sugar and fatty content of the milk almost completely disguising the taste of the yeast so that the beverage has a sweet creamy taste with a faint yeast flavor.

Another object of the invention is to provide a beverage of the character described above which will sour no more quickly than ordinary milk and may be used for cooking or other purposes without any injury whatsoever to the foodstuffs being cooked and without leaving any taste of yeast in the foodstuffs.

Another object of the invention is to provide a method of making the beverage which may be carried out with expedition and facility and which will avoid the necessity for utilizing a greater number of heating and cooling steps than those employed in the usual pasteurizing process.

In accordance with a preferred embodiment of the method, I take a batch of raw milk, that is to say, milk including all of the fatty and albuminous content, and pasteurize it by heating it to a temperature of above 143° F. and holding it at this heat for at least a half-hour as called for by the board of health regulations. This heat, maintained over the specified period, destroys dangerous pathogenic organisms.

The pasturized milk is then cooled rapidly down to at least 120° F. and liquid yeast is added to the batch. The amount of yeast added may vary considerably since it is entirely possible to make a very concentrated yeasted milk solution, but inasmuch as the usual medical requirement for patients requiring yeast is about three cakes a day I prefer to add about one and one-half ounces of yeast for each quart of milk in the batch. This amount is equivalent to about three cakes of the ordinary yeast but is less by volume than the three cakes, due to the fact that I employ so-called "baker's" yeast which is liquid yeast substantially devoid of starch. Preferably the yeast which is to be added is first dissolved in milk at a temperature of about 100° F. and in the quantity of one pound of yeast to one quart of milk. This dissolving action is merely intended to facilitate the complete and thorough mixture of the yeast with the batch of milk to be treated, and it is, of course, within the scope of the invention to introduce active or viable yeast directly into the partially cooled milk.

The temperature of the batch when the yeast is introduced therein may run at least as high as 120° F. and at least as low as 100° F. I do not intend to limit myself definitely to these temperature ranges but they have been found most effective in practice. A temperature of about 118° F. is preferred. If the yeast is introduced at a temperature much above 120° many of the yeast cells are killed, being unable to withstand the heat, and if the yeast is introduced when the milk is much below 100° or below body temperature, the fat in the milk is difficult to emulsify.

Having added the yeast to the batch the latter is then cooled to approximately 110° F. (thus guarding against destruction of any yeast germs) and immediately run through a homogenizer under a pressure of, say, 500 pounds per square inch, this pressure of course being subject to variation in accordance with the amount of yeast contained in the milk and with the characteristics of the milk itself.

The homogenizer, which may be of conventional type, in which a fine stream of milk under high pressure is squirted against a baffle plate, apparently serves a dual function in the present process. In the first place, it seems to completely break down the fatty or albuminous globules in the milk and form a complete emulsion to prevent subsequent stratification by gravity of the milk contents so that no cream will rise to the surface even though the emulsion be kept in an icebox for several days. The second function apparently performed by the homogenizer is to break up the yeast into individual cells or small cell groups thereby temporarily at least producing a yeast supension.

There is not sufficient accurate information available on the subject of the yeast cell to enable me to unqualifiedly state just what occurs in the homogenizing operation or to state exactly how a suspension is produced. My theory, however, is that the yeast which is a vegetable-like growth of linked cellular construction has its cells broken apart and separated in the homogenizer and that these individual cells have a tendency to cling to the fatty particles which are in suspension or in emulsion in the milk. In any event, the milk, which after the homogenizing process is immediately cooled down to below 50°, holds the yeast in a semi-suspended condition for a long period of time and a real suspension or mixture may be readily obtained thereafter by simply shaking the bottle containing the milk. Experiments have demonstrated that after the yeasted milk has stood for a day or two there is still yeast at the top of the bottle although the yeast content appears to gradually increase toward the bottom of the bottle, indicating that the yeast slowly precipitates or gravitates out of suspension. At a temperaure below 50°, however, the yeast cells while alive appear to be in a more or less dormant condition since the yeast content of the milk shows no tendency to increase materially even though the milk be kept at a temperature of below 50° for several days.

A quart of milk so formed contains approximately the nutritive value of a quart of pasteurized milk plus about three cakes of ordinary yeast without the starch which is commonly used in such cakes. By yeasting the milk the valuable vitamins B, D and E are added to the vitamins A, B and D contained in the milk and a highly nutritive and palatable beverage is obtained with vitamins B and D predominating.

By practicising the process as described above, an entirely unforeseen and advantageous result is accomplished insofar as the palatability of the resultant product is concerned.

An ounce and a half of yeast simply dissolved in ordinary milk gives the milk a very decided yeasty flavor, and a beverage thus produced is only slightly less palatable than a dry yeast cake. The homogenizing process which I utilize, however, seems to so thoroughly mix the yeast with the creamy and sugary content of the raw milk that the resultant beverage is highly palatable. It has a very faint yeasty taste and it does not have either the greasy and somewhat sickening taste of cream nor does it have the chalky taste of skimmed milk. The beverage, which has substantially no more viscosity than ordinary milk and which is in fact less viscous than cream, has a somewhat sweet and not unpleasant creamy taste with a very faint tang of yeast. Apparently the natural tastes of the yeast and the milk counteract each other to a large extent, with a resultant product which is more palatable than either of them alone.

While I have discussed the palatability of the beverage formed exactly in accordance with my process, it will be understood of course that it is within the scope of the invention to dissolve any desirable flavoring material, such for instance as chocolate, in the beverage, in which instance the presence of yeast will be hard to detect by tasting the beverage.

While the product is primarily intended for beverage purposes, one of its advantages is that it can be used for cooking and when so used the product cooked with the milk, or the milk or cream sauce on the product, has no flavor of yeast whatsoever. This is due to the fact that the usual cooking temperatures are well above 120° so that all of the yeast cells are killed and the aroma of the yeast is killed with them.

As suggested above, instead of making a yeasted beverage consisting mostly of milk and having but a slight amount of yeast in it, I may make a highly concentrated yeasted milk solution by the process described above which solution can be sold to milk dealers. The dealer may then manufacture a yeasted beverage by simply adding the concentrated yeasted milk to a batch of pasteurized milk and agitating the batch to uniformly distribute the concentrated solution through it.

The invention also lends itself well to provision of a yeasted milk mixture which may serve as both the milk ingredient and the leavening agent when baking bread. In other words, it is only necessary to determine what amount of milk and what amount of yeast are used in the dough, and then provide a yeasted milk in which the yeast and the milk are similarly proportioned, whereupon the necessity for adding yeast and milk separately to the dough batch is avoided, likewise for separately measuring the yeast and the milk, and one measuring operation will suffice.

Having thus described my invention, what I claim as new and desire to secure by Letters Patent is:—

1. As a new foodstuff, a homogenized emulsion of pasteurized raw milk including a small proportion of liquid yeast distributed substantially uniformly throughout the milk and having its cells sufficiently segregated to insure substantial dormancy of the yeast at a temperature below approximately 50° F.

2. A beverage having a sweet creamy taste and slightly flavored with yeast, consisting of pasteurized, homogenized raw milk and a plurality of substantially dormant and substantially segregated yeast cells distributed through it.

3. As a new foodstuff, a homogenized solution of raw milk containing vitamins A, B and D, and a finely divided (normally linked) cellular organism normally dormant at low temperatures distributed through the milk and containing vitamins B, D and E.

4. A method of producing yeasted milk which includes the step of homogenizing raw milk having a solution containing live yeast dissolved therein.

5. A method of producing yeasted milk which includes the steps of pasteurizing raw milk, introducing yeast into the milk and homogenizing the mixture thus formed to prevent stratification of the milk contents and effect substantial segregation of the yeast cells.

6. A method of forming yeasted milk which includes the steps of subjecting the milk to a pasteurizing temperature about 143° F., cooling the pasteurized milk to about 120° F., introducing liquid yeast into the milk at a temperature of not more than 120° F. nor less than 100° F., running the mixture thus formed through a homogenizer under high pressure, and then rapidly cooling the homogenized mixture to a temperature below 50° F.

7. A method as set forth in claim 6 wherein the mixture is run through the homogenizer at about 500 pounds pressure.

8. A method as set forth in claim 6 wherein the yeast by volume consists of about 1½% of the mixture.

9. A method of rendering more palatable raw milk containing yeast which includes the steps of running the mixture through an homogenizer to effect substantial emulsification of the creamy content of the milk with the remainder thereof and substantial separation of the normally linked yeast cells, and their distribution throughout the mixture.

10. As a new foodstuff, a homogenized solution consisting of sweet milk and live but substantially dormant finely divided yeast cells suspended therein.

11. A homogenized mixture consisting of pasteurized raw sweet milk and finely divided live yeast cells suspended therein and distributed substantially uniformly through the mixture, the mixture being devoid of a substantial amount of starch.

CHARLES L. PATTERSON.